(12) United States Patent
Foster et al.

(10) Patent No.: US 8,342,473 B2
(45) Date of Patent: Jan. 1, 2013

(54) THRUST MOUNTING ARRANGEMENT

(75) Inventors: Lawrence D Foster, Toulouse (FR); Michael H Young, Derby (GB)

(73) Assignee: Rolls-Royce PLC, London (GB)

( * ) Notice: Subject to any disclaimer, the term of this patent is extended or adjusted under 35 U.S.C. 154(b) by 46 days.

(21) Appl. No.: 12/457,297

(22) Filed: Jun. 5, 2009

(65) Prior Publication Data

US 2009/0309005 A1 Dec. 17, 2009

(30) Foreign Application Priority Data

Jun. 13, 2008 (GB) .................................. 0810791.4

(51) Int. Cl.
*F16M 13/00* (2006.01)

(52) U.S. Cl. ........................ 248/554; 248/557; 244/54

(58) Field of Classification Search .......... 248/554–557, 248/548; 244/54
See application file for complete search history.

(56) References Cited

U.S. PATENT DOCUMENTS

| | | | |
|---|---|---|---|
| 6,296,203 B1 | 10/2001 | Manteiga et al. | |
| 7,021,585 B2 * | 4/2006 | Loewenstein et al. | 244/54 |
| 7,607,609 B2 * | 10/2009 | Levert | 244/54 |
| 2004/0251380 A1 | 12/2004 | Pasquer et al. | |
| 2010/0127118 A1 * | 5/2010 | Combes et al. | 244/54 |

FOREIGN PATENT DOCUMENTS

| | | |
|---|---|---|
| EP | 0 564 126 A1 | 10/1993 |
| EP | 1 493 663 A1 | 1/2005 |
| FR | 2 887 850 A1 | 1/2007 |
| GB | 905922 | 9/1962 |
| GB | 2 010 969 A | 7/1979 |

\* cited by examiner

*Primary Examiner* — Bradley Duckworth
(74) *Attorney, Agent, or Firm* — Oliff & Berridge, PLC

(57) ABSTRACT

Mounting of gas turbine engines in aircraft requires use of thrust struts associated with mountings. It is important should there be failure that a load path is maintained. Furthermore, on a wing or in-situ inspection is highly desirable with respect to reducing maintenance costs. Of particular concern is failure as a result of cracking both sideways and vertical which may result in loss of all load paths through the mounting. By provision of independent cranks which are associated through crank pivots in apertures of the cranks and then articulation about central pivots provided in apertures and a central element along with pivot association of the struts through pivots created about apertures in the cranks load paths are maintained. By independent provision of the cranks sideways and vertical cracking cannot cause failure in both load paths to the arrangement from the struts. Furthermore, gaps between the cranks and the mounting and in particular snubber surface can be monitored to indicate component failure.

16 Claims, 2 Drawing Sheets

THRUST MOUNTING ARRANGEMENT

The present invention relates to thrust mounting arrangements and more particularly to a thrust mounting arrangement to secure a gas turbine engine to an aircraft utilising thrust struts.

Figure 1:
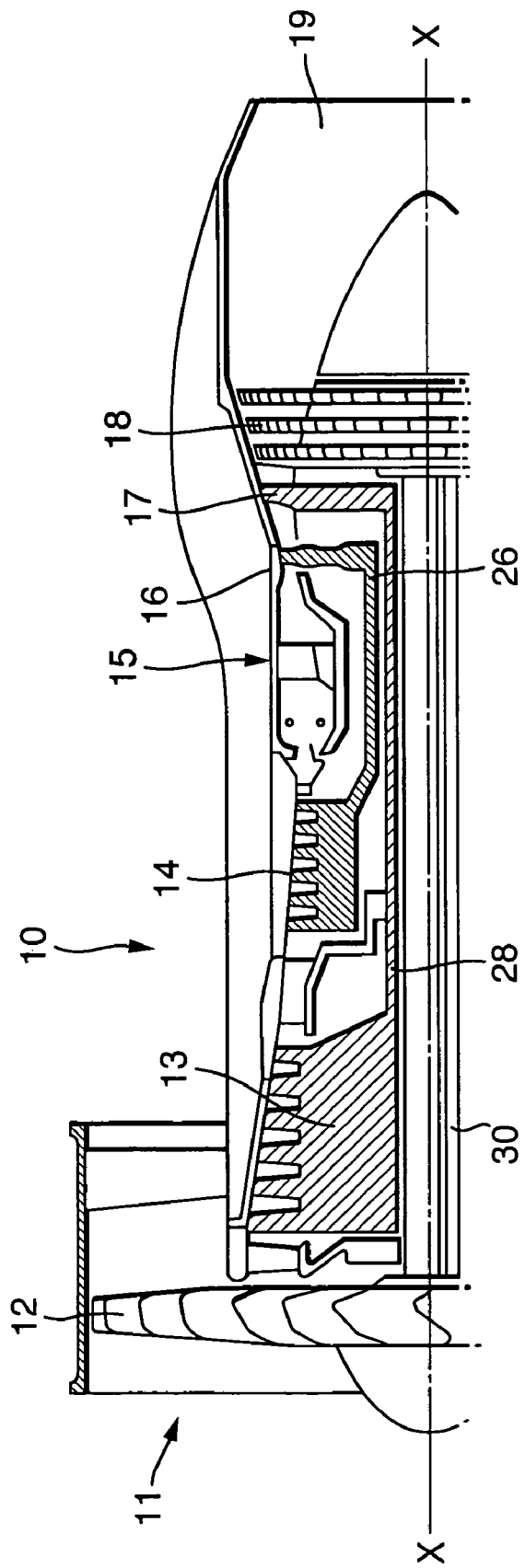

Referring to FIG. 1, a gas turbine engine is generally indicated at 10 and comprises, in axial flow series, an air intake 11, a propulsive fan 12, an intermediate pressure compressor 13, a high pressure compressor 14, a combustor 15, a turbine arrangement comprising a high pressure turbine 16, an intermediate pressure turbine 17 and a low pressure turbine 18, and an exhaust nozzle 19.

The gas turbine engine 10 operates in a conventional manner so that air entering the intake 11 is accelerated by the fan 12 which produce two air flows: a first air flow into the intermediate pressure compressor 13 and a second air flow which provides propulsive thrust. The intermediate pressure compressor compresses the air flow directed into it before delivering that air to the high pressure compressor 14 where further compression takes place.

The compressed air exhausted from the high pressure compressor 14 is directed into the combustor 15 where it is mixed with fuel and the mixture combusted. The resultant hot combustion products then expand through, and thereby drive, the high, intermediate and low pressure turbines 16, 17 and 18 before being exhausted through the nozzle 19 to provide additional propulsive thrust. The high, intermediate and low pressure turbines 16, 17 and 18 respectively drive the high and intermediate pressure compressors 14 and 13 and the fan 12 by suitable interconnecting shafts 26, 28, and 30.

It will be appreciated that the gas turbine engine 10 must be secured by an appropriate mounting on an aircraft wing or otherwise. Typically, such mountings include thrust struts which are connected via a yoke that pivots through a central pin to transmit engine thrust loads to a mounting block. Such articulation accommodates for tolerance variation and for thermal growth as well as engine deflection in use. Such thrust arrangements should also provide an indication as to failure. Should one thrust strut or corresponding yoke end fail then the arrangement will pivot about a centre pin such that a catcher pin associated with the arrangement will continue to provide a thrust load path. Such a failure can also be noted upon inspection in situ or on an aircraft wing by checking for catcher pin clearances. In normal use each catcher pin will be locate within an oversized hole. If the catcher pin is forced into providing the thrust load path then this clearance within the hole will be lost. If a rear mounting block was to develop cracks from the centre pivot for the yoke then these could propagate to both the catcher pin holes resulting in a complete failure with no reliable thrust path. Such a situation or potential for such a situation would be generally unacceptable. The potential for such a failure can be detected by inspecting the rear mounting block for cracks at regular intervals but such inspection requires the thrust mounting arrangement to be removed with the engine. Furthermore additional crack growth analysis and substantiation testing may be required at inspection intervals for sure detection of any cracks before failure in use occurs.

In view of the above it is clearly desirable to appropriately provide a thrust mounting arrangement for gas turbine engines and the like but similarly in safety critical situations it is also important that these thrust mounting arrangements are readily visually inspectable in situ.

In accordance with the present invention there is provided a mounting arrangement for mounting a gas turbine engine to a pylon of an aircraft, the gas turbine has a rotational axis the mounting arrangement comprises a mounting block, two thrust struts and two cranks each pivotably attached to one of the thrust struts and pivotably attached the mounting block, characterised in that a gap is provided between the two cranks and the mounting block.

Preferably, the two cranks are pivotably attached to one another.

Preferably, a centre link pivotably connects between the two cranks.

Alternatively, the two cranks overlap one another and are joined by a pivotable attachment.

Alternatively, the centre link is integral to one of the cranks and pivotably attached to the other crank.

Preferably, the crank extends either side of its pivotable attachment with the mount block.

Preferably, the crank or mount block define snubbers either side of the pivotable attachment with the mount block; the snubbers define at least a part of the gap.

Preferably, the pivotable attachment between the cranks is forward of the pivotable attachment of to the mounting block.

Preferably, the pivotable attachment of the thrust struts are forward of the pivotable attachments to the mounting block.

Preferably, the pivotable attachment(s) between the two cranks are circumferentially between the pivotable attachments of the thrust struts.

Preferably, each pivotable attachment to the mounting block is located circumferentially between the pivotable attachments of the thrust strut(s) and the pivotable attachment between the two cranks.

In accordance with aspects of the present invention there is provided a thrust mounting arrangement comprising of mounting having spaced apart pivot mountings for receiving a respective thrust strut secured through a pivot pin and a load device across the pivot mountings, the arrangement characterised in that the load device comprises a respective crank portion for each pivot mounting, each crank portion pivoted upon its respective pivot mounting about a crank pivot with the pivot pin for the thrust strut to one side of the crank pivot and a centre pivot to the other side of the crank, the cranks coupled between the centre pivot, each crank having a gap relative to a part of the mounting whilst the crank pivot, the centre pivot and the pivot pin retain their relative positions within the arrangement.

Generally, one gap closes towards an end of the respective crank if the relative position is lost by structural failure at least of position of one or more of the pivot pin and/or the pivot crank and/or the centre pivot.

Generally, the mounting has a snub element to oppose a part of at least one crank to define the gap.

Possibly, the respective cranks are directly coupled through the centre pivot. Alternatively, cranks are coupled by a centre element extending between centre pivots. Possibly, the centre element and associated centre pivots for the respective cranks are configured whereby structural failure of the centre element causes the gap to open or close.

Possibly, the cranks are provided by plates. Possibly, each crank comprises two plates extending either side of the mounting. Generally, the plates are independently associated with the pivot mounting and the thrust strut and the other crank.

Possibly, part of the mounting or crank has a witness surface to highlight any contact between the part of the mounting and the crank.

Possibly, the gap is filled with a displaceable element to identify by displacement of the displacement element closure or opening of the gap. Possibly, the displaceable element comprises a fluid. Possibly, the fluid is located within a burstable element to indicate opening and closing of the gap.

Possibly part of the mounting or the crank is frangible and an opposed part of the crank or mounting is arranged to cause detachment of the part which is frangible if the gap opens or closes.

Also in accordance with aspects of the present invention that is provided a gas turbine engine incorporating a thrust mounting arrangement as described above.

Figure 2:
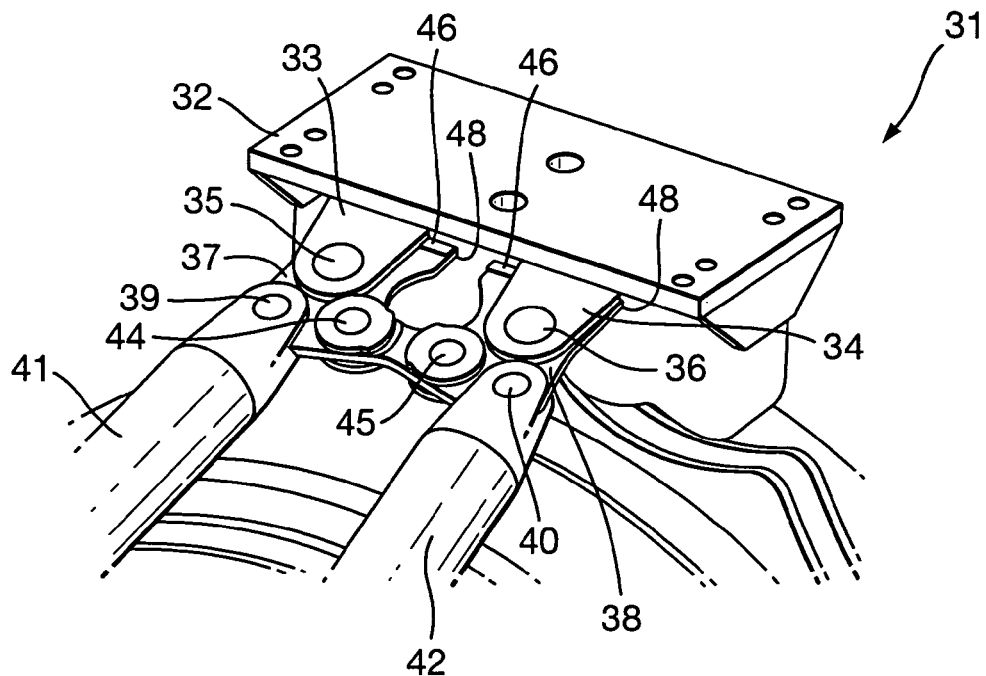
Figure 3:
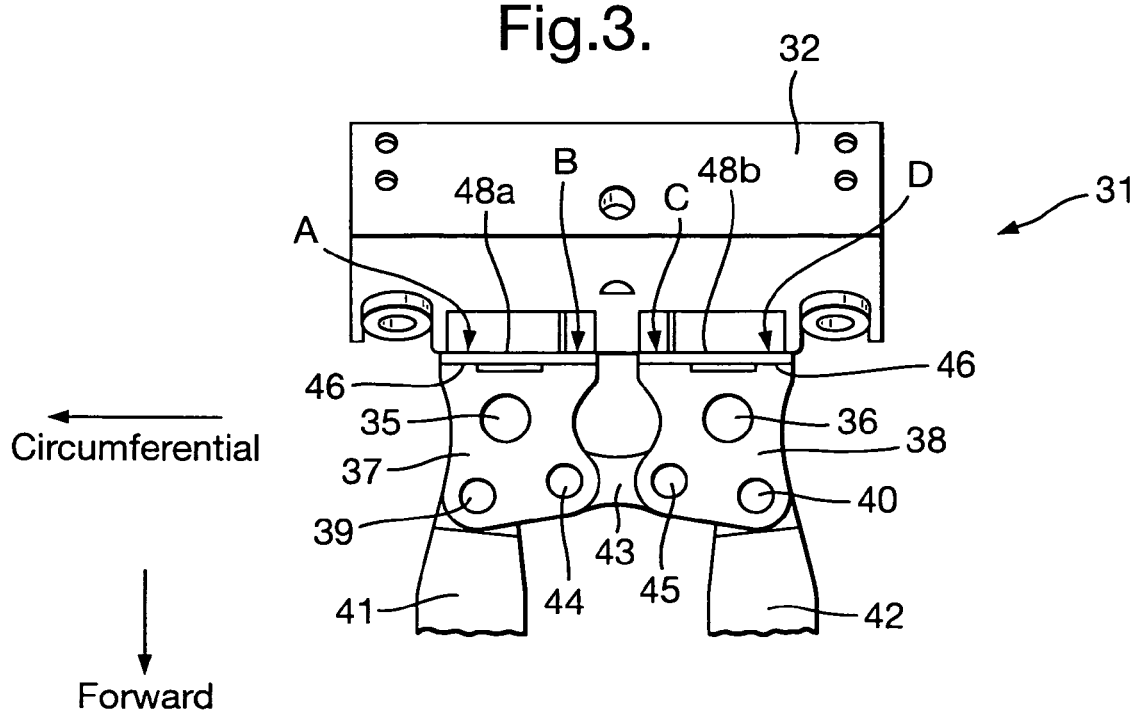

Aspects of the present invention will now be described by way of example only with reference to the accompanying drawings in which:

FIG. 2 is a schematic perspective view of a thrust mounting arrangement in accordance with aspects of the present invention; and FIG. 3 is a perspective plan view of the arrangement as depicted in FIG. 2.

Aspects of the present invention provide a thrust mounting arrangement in which two cranks are independently attached to a mounting by means of a pin and clevis joint. In such circumstances the cranks can rotate about the pin. Each crank is also associated with a respective thrust strut in use which transmits thrust load through the crank to the main mounting and onto a support structure. The cranks are connected through the pin and clevis joints to a common centre element in the embodiment depicted in order to provide stability through a linkage system. The complete linkage system allows articulation to compensate for tolerance variation with respect to the constituent components, relative thermal growth and engine movements to be expected in normal use. In a failure scenario a gap between the mounting and one of the cranks is utilised as an indicator. The gap will normally close as a result of an engagement between the crank and the mounting on one side and open on the other side relative to the other crank. Such engagement will provide an auxiliary load path to allow continuous operation of the thrust mounting arrangement despite such failure. The crank and main mounting are separate so that any cracks which may occur cannot grow sideways or vertically within the mounting arrangement or vice versa. In such circumstances the mounting arrangement in accordance with aspects of the present invention avoids the necessity for routine inspection and analysis for cracks within the mounting arrangement required with previous arrangements.

FIG. 2 provides a perspective view of a thrust mounting arrangement 31 in accordance with aspects of the present invention. The arrangement 31 comprises a mounting 32 associated with pivot mountings 33, 34. The pivot mountings 33, 34 have an aperture 35, 36 to receive a respective crank pin (not shown). The crank pins in the apertures 35, 36 allow and provide a crank pivot for crank elements 37, 38. The crank elements 37, 38 in such circumstances can pivot and articulate about the mountings 33, 34.

The cranks 37, 38 define further apertures 39, 40 within which a respective pivot pin for locating thrust struts 41, 42 is provided. Thus, the thrust struts 41, 42 are associated with a respective crank 37, 38 through the pivot pins and in turn the cranks 37, 38 are associated with the mountings 33, 34 for pivot articulation.

In accordance with aspects of the present invention the cranks 37, 38 are also arranged to pivot around a central pivot or with central pivot combination as illustrated between them. In the embodiment depicted in FIG. 2 this central pivot combination is achieved through a centre element 43 which is secured at each end through a central pivot 44, 45.

In the above circumstances the arrangement 31 through the articulation provided by the respective pivots created in apertures 35, 36, 39, 40, 44, 45 allows assembly adjustment for tolerance variation between the various components, relative thermal growth and expected normal engine movements. However, throughout such expected movements a gap 46 between opposed parts of the cranks 37, 38 and the mounting 32 is maintained. As illustrated generally snub surfaces 47, 48 are provided in order to define the gap 46 between the cranks 37, 38 and the snub surfaces 47, 48. Monitoring of the gap 46 will allow determination as to structural failure in the form of cracking or otherwise with regard to component parts of the arrangement 31 in accordance with aspects of the present invention.

Of particular importance with regard to aspects of the present invention is the independence and isolation of the respective cranks 37, 38 and associated crank pivots provided in the apertures 35, 36 from each other. In such circumstances structural cracks resulting in failure cannot grow sideways or vertically ensuring that failure from such cracks cannot result in failure of both potential auxiliary thrust load paths provided through the thrust struts 41, 42 and associated pivot pin to the respective cranks 37, 38 abutting the mounting 32. In such circumstances the arrangement 31 will remain operational until inspection of the gaps 46 indicates such failure and therefore remedial action can then be taken.

FIG. 3 provides a plan view of the arrangement 31 as depicted in FIG. 2 with pivot mountings 33, 34 removed for clarity. As indicated above in normal use the pivot mountings 33, 34 as depicted in FIG. 2 will overlay the cranks 37, 38 in order to allow pivoting about apertures 35, 36. The thrust struts 41, 42 as indicated are associated through pivot pins in apertures 39, 40 with the cranks 37, 38 to allow articulation in use for expected operational tolerance variation. However, should there be structural failure of the components then a load path is maintained. This load path is generally achieved through one or other of the cranks 37, 38 engaging an opposed part or snubber of the mounting 32. In such circumstances changes in the gap 46 will provide an indication as to structural failure or cracking which can be identified by on wing or in situ inspection rather than demounting for appropriate analysis and inspection. The scenarios with respect to failure are outlined below.

If the centre element 43 or associated centre pivots fail then the cranks 37, 38 will respectively engage at ends B, C if there is a forward thrust or ends A, D if there is a reverse thrust in terms of the load applied by the thrust struts 41, 42.

If thrust strut 42 structure fails or its related pivot pin in aperture 40 or crank pin in aperture 36 fails then end B of crank 37 will engage the snubber 48a in forward thrust or end B of the snubber 46 in reverse thrust.

Alternatively, if left hand thrust strut 41 or associated pivot pin in aperture 39 or crank pin in aperture 35 should fail then crank 38 will engage end C of snubber surface 48b in forward thrust or end D in reverse thrust.

If the right hand crank pin in aperture 36 fails then all the load will be taken by the left hand crank pin in aperture 35 such that end B of the snubber surface 48a will be engaged in forward thrust and end B will be engaged in reverse thrust.

Should the left hand crank pin in aperture 35 fail then all of the load will be taken by the right hand crank pin in aperture 36 such that end C of the snubber surface 48b will engage in forward thrust and end D in reverse thrust.

As indicated above structural failure of components within the arrangement 31 will in such circumstances result in maintenance of a load path to the mounting 32 for continued operation. This continued operation will be maintained until the gap 46 is again inspected in situ or on wing. Upon inspection of the gap 46 engagement of the snubber surfaces 48a,

48b will be identified. Such identification of narrowing or engagement across the gap 46 will indicate failure or early stage failure such as preliminary cracking and therefore weakness in the respective components allowing appropriate maintenance and remedial action to be taken.

By aspects of the present invention articulation and linkage is provided through the respective cranks 37, 38 and the pivots created about apertures 35, 36, 39, 40, 44, 45 and it will be appreciated that on wing inspection of a mounting arrangement 31 is achievable. Furthermore, the failure modes as indicated above are symmetrical and deterministic from the respective closure or engagement at the ends A, B, C, D on the snubber surface 48 allowing ready analysis and verification of failure within the arrangement 31 and so remedial action to be taken.

Generally in forward thrust the centre element 43 is loaded in compression by the thrust loads presented through the thrust struts 41, 42 to the cranks 37, 38. Such compression will inhibit crack growth within the centre element 43 and therefore restrict exposure to tensile loads in reverse thrust to only a fraction of the fatigue spectrum so improving the component life or offering a reduced weight component for the centre element 43.

As indicated above generally a centre element 43 is provided to allow for the articulation about the centre pivot combination created within apertures 44, 45. The centre element 43 may be removed and so a direct association between the cranks 37, 38 in forward thrust achieved. Elimination of the centre element 43 may provide savings with regard to cost and weight. In reverse thrust with such direct association and coupling between the cranks 37, 38 it will be understood that the cranks will move and so cause contact with respect to ends A, D. In effect by eliminating the centre element 43 an arrangement configuration is provided where effectively the centre element and its associated pivots have failed resulting in an indicative scenario for reverse thrust which is compensated for in initial configuration of the arrangement.

As indicated above aspects of the present invention are particularly relevant with regard to ensuring an appropriate load path is provided consistently despite component failure. In such circumstances by creating the cranks 37, 38 of separate plates associated either side or appropriately to the mountings 33, 34 (FIG. 2) and the thrust struts 41, 42 it will be understood that even greater durability may be achieved. If the respective plates are independently mounted, should one plate fail then the other is still in place to carry thrust loads at least temporarily until remedial action can be taken at next inspection. The plates may be designed to provide sufficient strength to continue with full loads or to precipitate a partial narrowing of the gap 46 indicative of failure of one plate and therefore a requirement for remedial action.

To further improve robustness the crank pivots provided in the apertures 36 may be of a double concentric pin nature so that if the outer pin fails the inner pin will still transmit applied load. However, outer pin failure will generally result in an asymmetric positioning of the inner pin resulting in again a reduction or alteration in the gap 46. This reduction or alteration in the gap will be detectable at next inspection.

Generally arrangements in accordance to aspects of the present invention as indicated will be configured to ensure a load path is provided should one or other of the components fail. By such a configuration it will be understood that in normal operation the gap 46 will be maintained through the respective component positioning particularly of the cranks 37, 38. Failure will open or close the gaps 46 allowing identification at maintenance inspection and remedial action to be taken. Provision of snubber surfaces 48 allows accurate determination of the gap 46 for comparison of such inspections. Such determination may be through a feeler gauge of the correct width. In order to further emphasise changes, in particular closure of the gap 46 parts of the snubber surfaces 48 may be arranged to provide witness of such closure such that in operation failure and therefore engagement by a respective crank 37 maybe identified by such witness surfaces. Thus, upon maintenance should the gap re-open as a result of residual torsion or other biases within the mounting arrangement identification of the engagement during operational periods can be notified. This witness surface may comprise a compliant surface which is compressed by the engagement and therefore noticeable once the engagement is removed. A further alternative may be to provide a displaceable element with the gap 46. This displaceable element and its removal will therefore be seen at inspection. The displaceable element may force the element out of the gap and therefore provide a noticeable feature. Alternatively, the displaceable element may comprise a fluid or gel which is squeezed from the gap and therefore becomes identifiable upon inspection. However, with respect to provision of witness surfaces and of displaceable elements it will be appreciated that generally the engagement as a result of closure of the gap 46 will be utilising to create a load path. This load path must be sufficiently robust to transfer thrust loads and therefore care must be taken in weakening the snubber surface 48. However, where such weakening of the snubber surface may be acceptable a proportion of the snubber surface 48 may be frangible so that it becomes detached upon in engagement and therefore again be more readily identifiable upon inspection. It will also be understood that use of a witness surface or other indicator of engagement may be capable of indicating an imbalance in the load applied through the thrust struts.

Aspects to the present invention have particular applicability with regard to mounting gas turbine engines through thrust struts and rear mountings with an aircraft. The mounting arrangement allows for reliable and continued operation through a thrust path should there be a failure of one or other of the thrust strut 41, 42 load paths in the arrangement. The arrangement 31 ensures such a load path is provided whilst also through the variations identifiable at inspection in the gap 46 notification available as to requirement for remedial action.

The present invention may be summarised as a mounting arrangement 31 comprising a mounting block 32, two thrust struts 41, 42 and two cranks 37, 38 each pivotably attached 39, 40 to one of the thrust struts and pivotably attached 35, 36 the mounting block, characterised in that a gap 46 is provided between the two cranks and the mounting block. The mounting arrangement 31 is intended for mounting a gas turbine engine to a pylon of an aircraft. The gas turbine has a rotational axis X-X to which the term circumferential applies. The two cranks, although there could be more where further thrust struts are employed, are pivotably attached to one another and as shown in FIGS. 2 and 3 via the centre link 43. Alternatively, the two cranks could extend and overlap one another and be joined by a pivotable attachment such as a pin as is well known. Furthermore, the centre link could be integral to one of the cranks and be pivotably attached to the other crank.

Importantly, the cranks extend either side of their pivotable attachment 35, 36 with the mount block. This is so that in the event of failure of a part of the mounting arrangement the ends A, B, C, D of the cranks can bear against the mount block and create a reasonably sized moment arm to keep stresses in the crank and bearing stress on the mount block within stress limits. Preferably, the snubbers 48 are specifically designed to be load bearing elements and are positions at the ends A, B, C, D of the cranks. Therefore the snubbers each define at least a part of the gap between each crank and the mounting block.

The relative locations of the pivotable attachments are important to ensure the arrangement is stable during normal engine operation and to react as required in the unlikely event of failure of the mounting arrangement. To this end the pivotable attachment 43, 44, 45 between the cranks is forward (towards the front of the engine) of the pivotable attachment 35, 36 to the mounting block. Further, the pivotable attachment 39, 40 of the thrust struts are forward of the pivotable attachments 35, 36 to the mounting block. Still further the pivotable attachment(s) 43, 44, 45 between the two cranks are located circumferentially between the pivotable attachments 40, 41 of the thrust struts. Yet still further, each pivotable attachment 35, 36 to the mounting block is located circumferentially between the pivotable attachments 40, 41 of the thrust strut(s) and the pivotable attachment 43, 44, 45 between the two cranks.

Modifications and alterations to aspects of the present invention will be appreciated by those skilled in the art. Thus for example it will be understood that the cranks 37, 38 are essentially bell cranks associated with pin and clevis joints and the respective apertures 35, 36, 39, 40, 44, 45. The respective size and distribution of the crank pivots provided in the apertures 35, 36, centre pivots through pivots in apertures 44, 45 as well as pivot association between the thrust struts 41, 42 with the cranks 37, 38 can all be adjusted to provide the degree of articulation necessary to precipitate engagement between the cranks and the mounting across the gap 46 and typically against snubber surfaces 48 of the mounting 32. It is by positioning the pivot pins in the apertures 39, 40 associating the thrust struts 41, 42 within the arrangement 31 that it will be understood the articulation to cause displacement to engagement with the ends A to D of the snubber surfaces 48 can be achieved and which allows witness of failure. Positioning of the respective pivots to cause articulation in such circumstances will depend upon operational requirements in terms of thrust load transfer in normal use as well as creation of a sufficiently robust load path in failure and identification through changes in the gap 46 in use.

The invention claimed is:

1. A mounting arrangement for mounting a gas turbine engine to a pylon of an aircraft, the mounting arrangement comprises:
   a mounting block,
   a first thrust strut and a second thrust strut, and
   a first crank and a second crank that is independent from the first crank, the first crank and the second crank being pivotably attached to the first thrust strut and the second thrust strut, respectively, and being pivotably attached to the mounting block, wherein a gap is provided between each of the two cranks and the mounting block,
   wherein in an event of failure of the first crank or the first thrust strut, the second crank is configured to contact the mounting block and bear against the mounting block.

2. A mounting arrangement as claimed in claim 1 wherein the two cranks are pivotably attached to one another.

3. A mounting arrangement as claimed in claim 2 wherein a centre link pivotably connects between the two cranks.

4. A mounting arrangement as claimed in claim 2 wherein the two cranks overlap one another and are joined by a pivotable attachment.

5. A mounting arrangement as claimed in claim 2 wherein the centre link is integral to one of the cranks and pivotably attached to the other crank.

6. A mounting arrangement as claimed in claim 1 wherein the crank extends either side of its pivotable attachment with the mount block.

7. A mounting arrangement as claimed in claim 1 wherein the crank or the mounting block define snubbers either side of the pivotable attachment with the mounting block, and the snubbers define at least a part of the gap.

8. A mounting arrangement as claimed in claim 2 wherein the pivotable attachment between the cranks is forward of the pivotable attachment to the mounting block.

9. A mounting arrangement as claimed in claim 1 wherein the pivotable attachment of the thrust struts are forward of the pivotable attachments to the mounting block.

10. A mounting arrangement as claimed in claim 2 wherein the pivotable attachment(s) between the two cranks are circumferentially between the pivotable attachments of the thrust struts.

11. A mounting arrangement as claimed in claim 2 wherein each pivotable attachment to the mounting block is located circumferentially between the pivotable attachments of the thrust strut(s) and the pivotable attachment between the two cranks.

12. An arrangement as claimed in claim 1 wherein part of the mounting or crank has a witness surface to highlight any contact between the part of the mounting and the crank.

13. An arrangement as claimed in claim 1 wherein the gap is filled with a displaceable element to identify by displacement of the displacement element closure or opening of the gap.

14. An arrangement as claimed in claim 1 wherein part of the mounting or the crank is frangible and an opposed part of the crank or mounting is arranged to cause detachment of the part which is frangible if the gap opens or closes.

15. An arrangement as claimed in claim 1 wherein in the event of failure of the first crank or the first thrust strut, the second crank bears against the mounting block by closing the gap.

16. The mounting arrangement of claim 1 wherein the gap is provided between each of the two cranks and the mounting block such that a closing of the gap is visible from an upper side of the mounting block.

* * * * *